United States Patent
An et al.

(10) Patent No.: US 10,067,481 B2
(45) Date of Patent: Sep. 4, 2018

(54) ELECTRONIC DEVICE AND METHOD OF CORRECTING POSITION THEREOF

(71) Applicant: Samsung Electronics Co., Ltd., Suwon-si, Gyeonggi-do (KR)

(72) Inventors: Jung-Chul An, Hwaseong-si (KR); Sea-Young Lee, Suwon-si (KR); Jung-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 126 days.

(21) Appl. No.: 15/046,927

(22) Filed: Feb. 18, 2016

(65) Prior Publication Data

US 2016/0246265 A1    Aug. 25, 2016

(30) Foreign Application Priority Data

Feb. 24, 2015 (KR) .................... 10-2015-0026089

(51) Int. Cl.
  *H02J 7/00*  (2006.01)
  *G05B 1/01*  (2006.01)
  *H02J 7/02*  (2016.01)
  *H02J 50/12*  (2016.01)
  *H02J 50/90*  (2016.01)

(52) U.S. Cl.
  CPC .............. *G05B 1/01* (2013.01); *H02J 7/025* (2013.01); *H02J 50/12* (2016.02); *H02J 50/90* (2016.02)

(58) Field of Classification Search
  CPC .................................. H02J 50/90; H02J 50/12
  USPC ......................................................... 320/108
  See application file for complete search history.

(56) References Cited

U.S. PATENT DOCUMENTS

| | | | |
|---|---|---|---|
| 2012/0139484 A1* | 6/2012 | Gunderman | H02J 7/0044 320/108 |
| 2012/0200254 A1 | 8/2012 | Yoon | |
| 2013/0307475 A1 | 11/2013 | Kishiyama et al. | |
| 2015/0263565 A1* | 9/2015 | Amano | H02J 7/025 320/108 |
| 2015/0303732 A1* | 10/2015 | Dow | H02J 7/025 320/108 |
| 2016/0118179 A1* | 4/2016 | Park | H01F 27/2871 320/108 |
| 2016/0199657 A1* | 7/2016 | Jiang | A61N 1/3787 607/61 |
| 2016/0336817 A1* | 11/2016 | Jabori | H04M 1/72569 |
| 2017/0063128 A1* | 3/2017 | Van Bosch | H02J 7/025 |
| 2017/0287630 A1* | 10/2017 | Pais | H01F 38/14 |

FOREIGN PATENT DOCUMENTS

KR    10-2012-0090240 A    8/2012

* cited by examiner

*Primary Examiner* — Suchin Parihar
(74) *Attorney, Agent, or Firm* — Jefferson IP Law, LLP

(57) ABSTRACT

An electronic device is provided. The electronic device includes at least one vibration motor, and a processor configured to determine whether to correct a position of the electronic device and to control driving of the at least one vibration motor according to a result of the determination on the position correction.

21 Claims, 14 Drawing Sheets

ELECTRONIC DEVICE AND METHOD OF CORRECTING POSITION THEREOF

CROSS-REFERENCE TO RELATED APPLICATION(S)

This application claims the benefit under 35 U.S.C. § 119(a) of a Korean patent application filed on Feb. 24, 2015 in the Korean Intellectual Property Office and assigned Serial number 10-2015-0026089, the entire disclosure of which is hereby incorporated by reference.

TECHNICAL FIELD

The present disclosure relates to an electronic device and a method of correcting a position thereof. More particularly, the present disclosure relates to an electronic device for determining the necessity of the position correction and automatically correcting the position of the electronic device when position correction is necessary for an electronic device.

BACKGROUND

Electronic devices, such as mobile phones, smart phones, or personal digital assistants (PDAs), may be driven with a rechargeable battery due to characteristics thereof, and may receive electric energy from the outside to charge the battery. For example, such electronic devices may receive the electric energy from the outside in a wired or wireless charging manner in order to charge the battery.

In a wired charging method, an electronic device may allow an external charging device and a battery to be electrically connected to each other through contact between contact terminals of the external charging device and the battery, so that the battery can be charged with electric energy from the external charging device.

In a wireless charging method, using wireless power transmission/reception between an external wireless power supply device and an electronic device, a battery of the electronic device can be automatically charged only if the electronic device is placed on a charging pad without being connected thereto through a separate charging connector.

In order to receive power from a wirelessly rechargeable device, for example a charging pad, such an electronic device has to be placed on the charging pad or located close thereto. However, wireless charging efficiency may vary according to how close the electronic device approaches the charging device or a location where the electronic device approaches the charging device. In order to increase the wireless charging efficiency, it is important to place the electronic device at a position satisfying optimum charging efficiency when the electronic device receives charging power from the charging device. In addition, the electronic device may be in a situation where the position thereof has to be corrected due to diverse reasons as well as the above-described wireless charging situation.

However, in order to correct the position of the electronic device, a user has to directly correct the position, and it may be difficult for the user to identify whether the electronic device is accurately placed at a desired position.

Therefore, a need exists for an electronic device for determining the necessity of the position correction and automatically correcting the position of the electronic device when position correction is necessary for an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for determining the necessity of the position correction and automatically correcting the position of the electronic device when position correction is necessary for an electronic device.

In accordance with an aspect of the present disclosure, an electronic device for addressing such issues in the related art is provided. The electronic device includes at least one vibration motor, and a processor configured to determine whether to correct a position of the electronic device and to control driving of the at least one vibration motor according to a result of the determination on the position correction.

In accordance with another aspect of the present disclosure, an operating method of an electronic device is provided. The operating method includes determining whether to correct a position of an electronic device, and generating a control signal for controlling driving of at least one vibration motor according to a result of the determination.

Various embodiments of the present disclosure provide an electronic device and a method of correcting a position thereof which can accurately place the electronic device at a desired position even though a user does not directly move the electronic device when position correction is necessary for the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
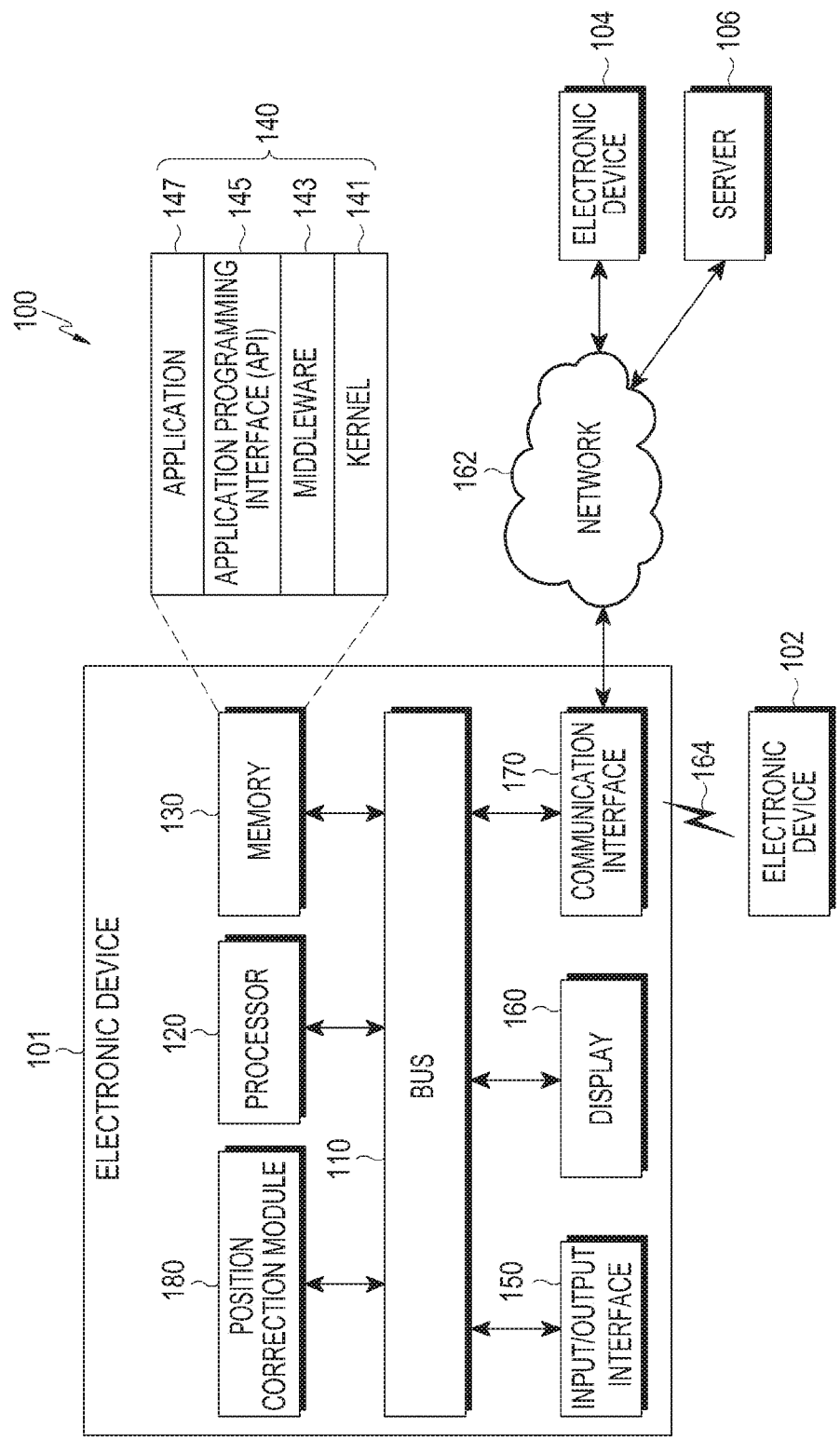
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In embodiments of the present disclosure, the expression "have", "may have", "include" or "may include" refers to existence of a corresponding feature (e.g., a numerical value, a function, an operation, or components, such as elements), and does not exclude existence of additional features.

In embodiments of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The expressions may be used to distinguish a component element from another component element. For example, a first user device and a second user device may indicate different user devices regardless of the sequence or importance thereof. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when one component element is "directly coupled" or "directly connected" to another component element, it may be construed that a third component element does not exist between the first component element and the second component element.

The expression "configured to" used in embodiments of the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

The terms used in embodiments of the present disclosure are only used to describe specific embodiments of the present disclosure, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in embodiments of the present disclosure. In some cases, even the term defined in embodiments of the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group (MPEG-1 or MPEG-2) Audio Layer 3 (MP3) player, a mobile medical appliance, a camera, and a wearable device (e.g., a head-mounted-device (HMD), such as electronic glasses, electronic clothes, an electronic bracelet, an electronic necklace, an electronic appcessory, electronic tattoos, a smart watch, and the like).

According to various embodiments of the present disclosure, the electronic device may be a smart home appliance. The home appliance may include at least one of, for example, a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. The term "user" used in the present specification may refer to a person or a device (for example, an artificial intelligence electronic device) using an electronic device.

FIG. 1 illustrates a network environment according to an embodiment of the present disclosure.

Referring to FIG. 1, an electronic device 101 in a network environment 100, according to various embodiments of the present disclosure, will be described with reference to FIG. 1. The electronic device 101 may include at least one of a bus 110, a processor 120, a memory 130, an input/output interface 150, a display 160, and a communication interface 170, and a position correction module 180. In an embodiment of the present disclosure, at least one of the elements may be omitted from the electronic device 101, or other elements may be additionally included in the electronic device 101.

The bus 110 may include, for example, a circuit for interconnecting the elements 110 to 180 and transferring communication (e.g., a control message and/or data) between the elements.

The processor 120 may include one or more of a CPU, an AP, and a Communication Processor (CP). The processor 120 may, for example, carry out operations or data processing related to control and/or communication of at least one other element of the electronic device 101.

The memory 130 may include a volatile memory and/or a non-volatile memory. The memory 130 may store, for example, instructions or data related to at least one other element of the electronic device 101. According to an embodiment of the present disclosure, the memory 130 may store software and/or a program 140. The program 140 may include, for example, a kernel 141, middleware 143, an Application Programming Interface (API) 145, and/or application programs (or applications) 147. At least some of the kernel 141, the middleware 143, and the API 145 may be referred to as an Operating System (OS).

The kernel 141 may, for example, control or manage system resources (e.g., the bus 110, the processor 120, and the memory 130) which are used to execute operations or functions implemented in the other programs (e.g., the middleware 143, the API 145, and the application programs 147). In addition, the kernel 141 may provide an interface through which the middleware 143, the API 145, or the application program 147 may access individual elements of the electronic device 101 to control or manage the system resources.

The middleware 143 may function as a relay for allowing the API 145 or the application programs 147 to communicate with the kernel 141 to exchange data. Furthermore, in relation to task requests received from the applications 147, the middleware 143 may perform a control (e.g., scheduling or load-balancing) for the task requests, for example, using a method of assigning, to at least one of the application programs 147, a priority for using the system resources of the electronic device 101 (e.g., the bus 110, the processor 120, the memory 130, and the like).

The API 145 is an interface through which the applications 147 control functions provided by the kernel 141 or the middleware 143, and may include at least one interface or function (e.g., an instruction) for file control, window control, image processing, text control, and the like.

The input/output interface 150 may function as, for example, an interface that may transfer instructions or data, which is input from a user or another external device, to the other elements of the electronic device 101. In addition, the input/output interface 150 may output, to a user or another external device, instructions or data received from the other elements of the electronic device 101.

The display 160 may include, for example, a liquid crystal display (LCD), a light emitting diode (LED) display, an organic LED (OLED) display, a micro electro mechanical system (MEMS) display, an electronic paper display, and the like. The display 160 may display, for example, various types of content (e.g., a text, images, videos, icons, symbols, and the like) to the user. The display 160 may include a touch screen and receive, for example, a touch input, a gesture input, a proximity input, or a hovering input using an electronic device or the user's body part.

The communication interface 170 may configure communication 164 between the electronic device 101 and an external device (e.g., electronic devices 102, 104 or a server 106). For example, the communication interface 170 may communicate with an external device (e.g., a pad-type wireless power transmitter) while being connected to a network 162 through wireless or wired communication.

The wireless communication may use at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM) as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks, such as a computer network (e.g., a Local Area Network (LAN) or a Wide Area Network (WAN)), the Internet, a telephone network, and the like.

The electronic devices 102, 104 may be the same as, or a different device from, the electronic device 101. According to an embodiment of the present disclosure, the server 106 may include a group of one or more servers. According to various embodiments of the present disclosure, all or some operations executed in the electronic device 101 may be carried out in another electronic device or a plurality of electronic devices (e.g., the electronic devices 102, 104 and the server 106). According to an embodiment of the present disclosure, when the electronic device 101 has to perform functions or services automatically or in response to a request, the electronic device 101 may request the other device (e.g., the electronic device 102 or 104 or the server 106) to perform at least some functions related thereto additionally or instead of autonomously executing the function or service or in addition. The other electronic device (e.g., the electronic device 102 or 104 or the server 106) may carry out the requested functions or the additional functions and transfer, to the electronic device 101, the result obtained by carrying out the functions. The electronic device 101 may process the received result as it is or additionally to provide the requested functions or services. To this end, for example, a cloud computing technology, a distributed computing technology, or a client-server computing technology may be used.

Referring to FIG. 1, the electronic device 101 includes the communication interface 170 to communicate with the external electronic device 104 or the server 106 through the network 162. However, according to various embodiments of the present disclosure, the electronic device 101 may be implemented to independently operate therein without a separate communication function.

The position correction module 180 may process at least some information acquired from the other elements (e.g., the processor 120, the memory 130, the input/output interface 150, the communication interface 170, and the like) and provide the processed information to the user in various manners. For example, according to various embodiments of the present disclosure, the position correction module 180 may determine whether to correct the position of the electronic device 101 and according to the result of the determination on the position correction, may correct the position of the electronic device 101 by driving at least one vibration motor. Additional information on the position correction module 180 will be provided through FIG. 5 described below.

Although the position correction module 180 is illustrated as a separate module from the processor 120 in FIG. 1, at least a part of the position correction module 180 may be included in the processor 120 or at least one other module, and all functions of the position correction module 180 may be implemented in the illustrated processor 120 or another processor.

Various embodiments of the present disclosure may be applied to a situation in which the electronic device 101 is wirelessly charged while being placed on a wireless charging pad functioning as a wireless charging transmitter. Hereinafter, a wireless charging transmitter and a wireless charging receiver, to which the various embodiments of the present disclosure may be applied, will be described with reference to FIGS. 2 and 3. However, it should be understood that the various embodiments of the present disclosure are not limited to the wireless charging situation. The various embodiments of the present disclosure may be applied to a variety of situations requiring position correction of an electronic device.

Figure 2:
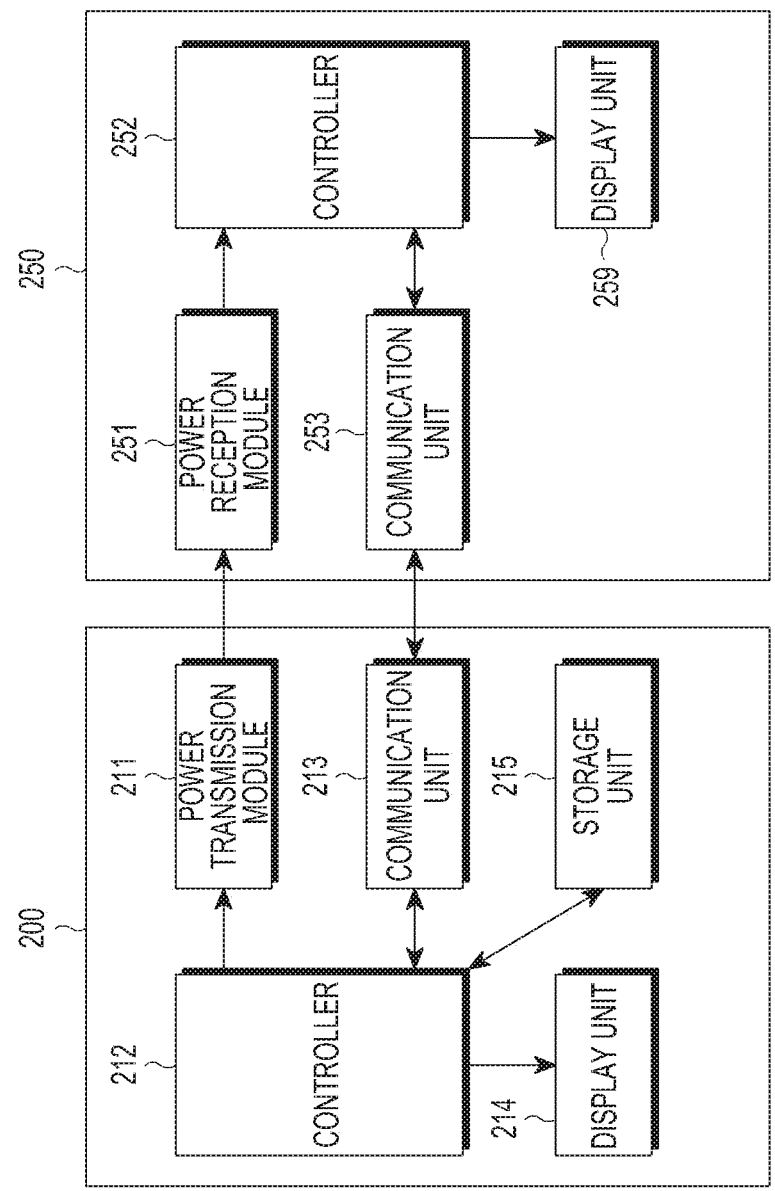
FIG. 2 is a block diagram illustrating a structure of a wireless charging transmitter and a wireless charging receiver according to various embodiments of the present disclosure.

FIG. 2 is a block diagram illustrating a structure of a wireless charging transmitter and a wireless charging receiver according to various embodiments of the present disclosure.

Referring to FIG. 2, a wireless power transmitter 200 may include at least one of a power transmission module 211, a controller 212, a communication unit 213, a display unit 214, and a storage unit 215. Furthermore, a wireless power receiver 250 may include at least one of a power reception module 251, a controller 252, a communication unit 253, and a display unit 259.

According to various embodiments of the present disclosure, the wireless power transmitter 200 may be configured as a separate electronic device (e.g., a wireless charging pad) or may be included in the form of a wireless power transmission unit in any one of the various electronic devices described above. In addition, according to various embodiments of the present disclosure, the wireless power receiver 250 may be configured as a separate electronic device or may be included in the form of a wireless power reception unit in any one of the various electronic devices described above.

The power transmission module 211 may supply power required by the wireless power transmitter 200 and supply power to the wireless power receiver 250 in a wireless manner. Here, the power transmission module 211 may supply power in an AC waveform, and may convert power of a DC waveform into power of an AC waveform using an inverter to supply the power of the AC waveform. The power transmission module 211 may be implemented in the form of a built-in battery. Alternatively, the power transmission module 211 may be implemented in the form of a power reception interface to receive power from the outside and supply the received power to other elements. It will be easily understood by those skilled in the art that any unit capable of supplying power of an AC waveform may be used as the power transmission module 211 without limitation.

The controller 212 may control an overall operation of the wireless power transmitter 200. The controller 212 may control the overall operation of the wireless power transmitter 200 using an algorithm, a program, or an application required for control, which is read out of the storage unit 215. The controller 212 may be implemented in the form of a CPU, a microprocessor, a minicomputer, and the like.

The communication unit 213 may communicate with the wireless power receiver 250 through a scheme. The communication unit 213 may receive power information from the wireless power receiver 250. Here, the power information may include at least one of the capacity of the wireless power receiver 250, a residual quantity of a battery, the number of times the battery has been charged, the amount of the used battery, a battery capacity, and a battery ratio. In addition, the communication unit 213 may transmit a charging function control signal for controlling a charging function of the wireless power receiver 250. The charging function control signal may be a control signal which controls the wireless power reception module 251 of the wireless power receiver 250 to enable or disable the charging function. Furthermore, the power information may also include information on lead-in of a wired charging terminal, change from a stand-alone (SA) mode to a non-stand-alone (NSA) mode, release of an error situation, and the like which will be described below.

The communication unit 213 may receive a signal from another wireless power receiver (not illustrated) as well as the communication unit 253 of the wireless power receiver 250.

The controller 212 may display the state of the wireless power receiver 250 on the display unit 214 based on a message received through the communication unit 213 from the wireless power receiver 250. In addition, the controller 212 may also display, on the display unit 214, an expected time when the wireless power receiver 250 is to be completely charged.

Furthermore, according to various embodiments of the present disclosure, position information, position correction information, and position movement information as well as various pieces of charging state information of the wireless power receiver 250 may be displayed on the display unit 259 of the wireless power receiver 250.

Figure 3:
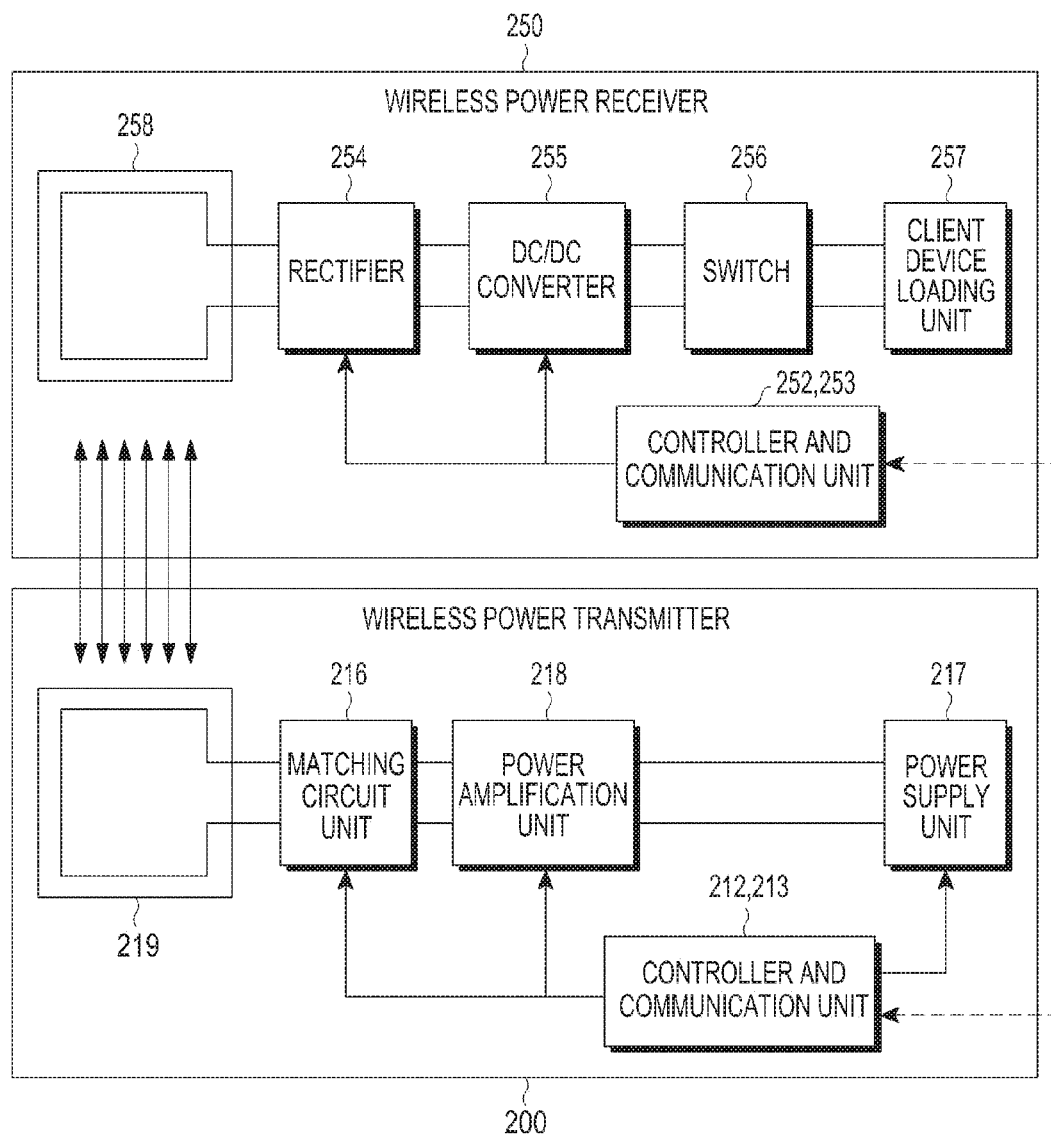
FIG. 3 is a block diagram illustrating a structure of a wireless charging transmitter and a wireless charging receiver according to various embodiments of the present disclosure.

FIG. 3 is a block diagram illustrating a wireless power transmitter and a wireless power receiver according to various embodiments of the present disclosure.

Referring to FIG. 3, the wireless power transmitter 200 may include a power transmission unit 219, the controller 212, the communication unit 213, a power supply unit 217, a power amplification unit 218, and a matching circuit unit 216. The wireless power receiver 250 may include a power reception unit 258, the controller 252, the communication unit 253, a rectifier 254, a DC/DC converter 255, a switch 256, and a client device loading unit 257.

The power supply unit 217 may output DC power that has a preset voltage value. The voltage value of the DC power output from the power supply unit 217 may be controlled by the controller 212 and the communication unit 213.

A DC current output from the power supply unit 217 may be output to the power amplification unit 218. The power amplification unit 218 may amplify the DC current with a preset gain. In addition, according to various embodiments of the present disclosure, the power amplification unit 218 may adjust a gain value according to contextual information of the wireless power receiver 250. Furthermore, the power amplification unit 218 may convert DC power to AC power based on a signal input from the controller 212 and the communication unit 213. Accordingly, the power amplification unit 218 may output AC power.

The matching circuit unit 216 may perform impedance matching. For example, the matching circuit unit 216 may adjust impedance viewed therefrom to control output power to have high-efficiency and high-power. The matching circuit unit 216 may adjust the impedance under the control of the controller 212 and the communication unit 213. The matching circuit unit 216 may include at least one of a coil and a capacitor. The controller 212 and the communication unit 213 may control a connection state with at least one of the coil and the capacitor and accordingly perform impedance matching.

The power transmission unit 219 may transmit input AC power to the power reception unit 258. The power transmission unit 219 and the power reception unit 258 may be implemented with a resonant circuit having the same resonance frequency. For example, the resonance frequency may be determined to be 6.78 MHz. The controller 212 and the communication unit 213 may communicate with the controller 252 and the communication unit 253 of the wireless power receiver 250 and perform communication (Wireless Fidelity (Wi-Fi), ZigBee, or Bluetooth (BT)/BT Low Energy (BLE)), for example, with a frequency of 2.4 GHz in both directions. The power reception unit 258 may receive charging power.

The rectifier 254 may rectify the wireless power, received by the power reception unit 258, in the form of DC and may be implemented in the form of, for example, a diode bridge. The DC/DC converter 255 may convert the rectified power with a preset gain. For example, the DC/DC converter 255 may convert the rectified power in such a manner that the output end thereof has a voltage of 5V. The minimum and maximum values of an applicable voltage may be set in advance at the front end of the DC/DC converter 255.

The switch 256 may interconnect the DC/DC converter 255 and the client device loading unit 257. The switch 256 may be maintained in an on/off state under the control of the controller 252. The switch 256 may be omitted. When the switch 256 is in the on state, the client device loading unit 257 may store the converted power input from the DC/DC converter 255.

Figure 4:
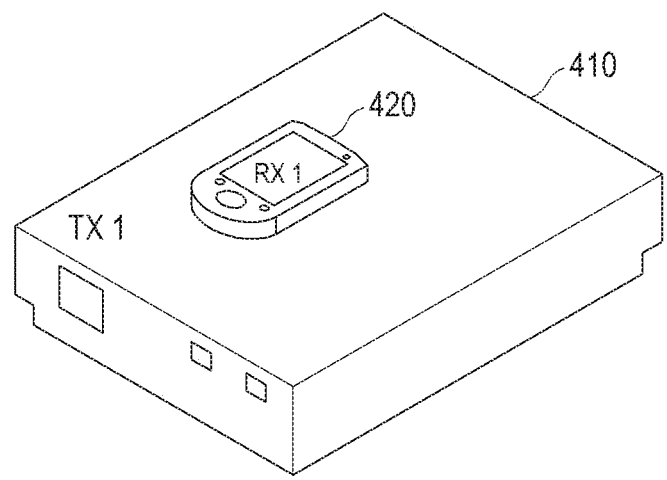
FIG. 4 is a perspective view of a wireless charging transmitter on which a wireless charging receiver is placed according to various embodiments of the present disclosure.

FIG. 4 is a perspective view of a wireless power transmitter on which a wireless power receiver is placed according to an embodiment of the present disclosure.

Referring to FIG. 4, a wireless power transmitter 410 may be implemented in a pad form and provide a wireless charging function while a wireless power receiver 420 (e.g., an electronic device, such as a smart phone) to be charged is placed on the wireless power transmitter 410. The wireless power receiver 420 may exhibit different wireless charging efficiency according to a position thereof on the pad of the wireless power transmitter 410.

According to various embodiments of the present disclosure, the wireless power receiver 420 may move to an optimum charging position on the wireless power transmitter 410 to increase wireless charging efficiency. For example, according to various embodiments of the present disclosure, the wireless power receiver 420 may measure current or magnetic field strength through at least one sensor to determine whether the current position thereof corresponds to an optimum charging position. When the result of the determination shows that it is necessary to correct the position of the wireless power receiver 420, the wireless power receiver 420 may drive at least one vibration motor embedded therein to correct the position thereof. The wireless power receiver 420 may be an example of the electronic device 101 described above with reference to FIG. 1.

Figure 5:
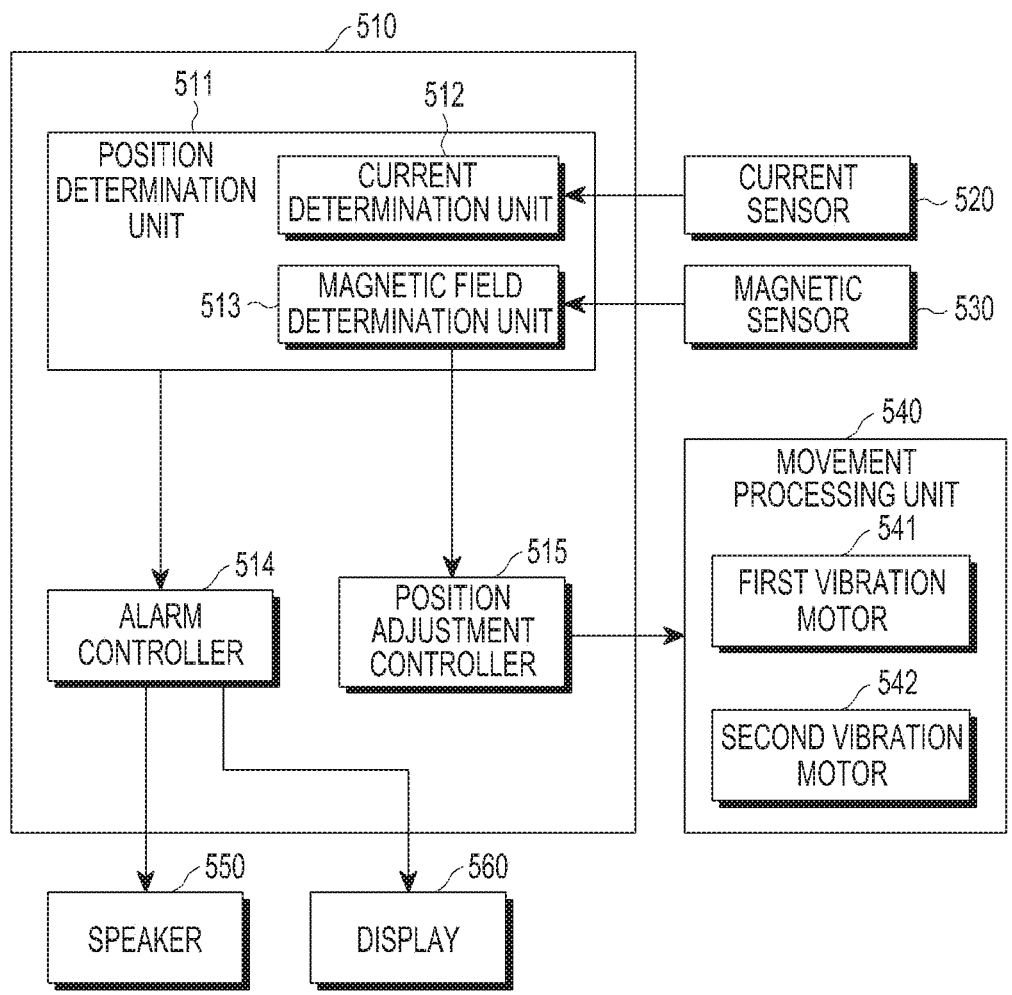
FIG. 5 is a block diagram of a position correction module of an electronic device according to various embodiments of the present disclosure.

FIG. 5 is a block diagram of a position correction module of an electronic device according to various embodiments of the present disclosure.

Referring to FIG. 5, for convenience of description, an example will be described in which the position correction module 180 is carried out within the processor 120. For example, at least one configuration included in a position correction module 510 of FIG. 5 may be included in the position correction module 180 or the processor 120 of FIG. 1.

Referring to FIG. 5, the electronic device may include at least one of the position correction module 510, a current sensor 520, a magnetic sensor 530, a movement processing unit 540, a speaker 550, and a display 560. In addition, according to various embodiments of the present disclosure, the position correction module 510 may include at least one of a position determination unit 511, an alarm controller 514, and a position adjustment controller 515.

Through various methods, the position determination unit 511 may determine whether the current position where the electronic device is placed is a position requiring correction. For example, according to various embodiments of the present disclosure, based on the amount of current detected by the current sensor 520, a current determination unit 512 of the position determination unit 511 may determine whether the current position corresponds to an optimum position. For example, when the amount of current detected by the current sensor 520 is less than a preset threshold value, the current determination unit 512 may determine that position correction is necessary. The current sensor 520 may be implemented by at least one device or various circuits and may include, for example, a current mirror circuit or a detecting resistor.

In addition, according to various embodiments of the present disclosure, based on the magnetic flux density, the magnetic field strength, or the magnetic field intensity detected by the magnetic sensor 530, a magnetic field determination unit 513 of the position determination unit 511 may determine whether the current position corresponds to an optimum position. For example, when the magnetic flux density, the magnetic field strength, or the magnetic field intensity detected by the current sensor 530 is less than a preset threshold value, the magnetic field determination unit 513 may determine that position correction is necessary. The magnetic sensor 530 may be implemented by at least one device or various circuits.

When it is determined that the position correction of the electronic device is necessary, the position determination unit 511 may notify, through the alarm controller 514, a user that the position correction is necessary. For example, when the position determination unit 511 determines that the position correction of the electronic device is necessary, the alarm controller 514 may control the speaker to output an alert sound or the display 560 to display an alert message.

According to various embodiments of the present disclosure, when the position determination unit 511 determines that the position correction of the electronic device is necessary, the position adjustment controller 515 may control the driving of a least one vibration motor 541 or 542 to move the position of the electronic device.

For example, when it is determined that the position correction is necessary, the position adjustment controller 515 may output a drive signal for controlling the vibration motor to move the electronic device to a preset arbitrary position or in an arbitrary direction. Detailed embodiments of a position adjusting method of the position adjustment controller 515, according to various embodiments of the present disclosure, will be described after a description of FIG. 10.

The movement processing unit 540 may include at least one vibration motor 541 or 542. The movement processing unit 540 may receive a control signal from the position adjustment controller 515 and control the driving of each vibration motor 541 or 542 to move the electronic device. For example, according to various embodiments of the present disclosure, the movement processing unit 540 may adjust the rotation direction of one vibration motor 541 to control the moving direction of the electronic device. In addition, according to various embodiments of the present disclosure, the movement processing unit 540 may adjust the rotation directions of two or more vibration motors 541, 542 to control the moving direction of the electronic device. Specific embodiments thereof will be described below. The vibration motors 541, 542 may be implemented by various types of motors. For example, the vibration motors 541, 541 may be implemented by a DC motor or a coil motor, and various embodiments of the present disclosure is not limited to the particular type of motor.

An electronic device, according to any one of various embodiments of the present disclosure, may include at least one vibration motor, and a processor that determines whether to correct a position of the electronic device and controls driving of the vibration motor according to the result of the determination on the position correction.

According to various embodiments of the present disclosure, the processor may control a moving direction of the electronic device by controlling a rotation direction of the vibration motor.

According to various embodiments of the present disclosure, the electronic device may further include a current sensor that measures current, wherein the processor may determine whether to correct the position of the electronic device based on the current value detected by the current sensor.

According to various embodiments of the present disclosure, the electronic device may further include a magnetic sensor that measures intensity of a magnetic field, wherein the processor may determine whether to correct the position of the electronic device based on the intensity of the magnetic field detected by the magnetic sensor.

According to various embodiments of the present disclosure, the electronic device may further include a first vibration motor disposed on an upper side of the electronic device and a second vibration motor disposed on a lower side of the electronic device, wherein the processor may control driving of the first vibration motor and the second vibration motor according to the result of the determination on the position correction.

According to various embodiments of the present disclosure, the processor may control a moving direction of the electronic device by rotating the first vibration motor and the second vibration motor in opposite directions.

According to various embodiments of the present disclosure, the processor, after rotating the vibration motor according to the result of the determination on the position correction, may control the vibration motor to rotate in an opposite direction when a detected value is less than that detected before the vibration motor rotates.

According to various embodiments of the present disclosure, the electronic device may further include a speaker, wherein the processor may control the speaker to output an alert sound when the result of the determination on the position correction shows that the position correction is necessary for the electronic device.

According to various embodiments of the present disclosure, the electronic device may further include a display, wherein the processor may control the display to display an alert message when the result of the determination on the position correction shows that the position correction is necessary for the electronic device.

According to various embodiments of the present disclosure, the processor may make a control to start wireless charging when the result of the determination on the position correction shows that the electronic device is placed at a normal position.

Figure 6:
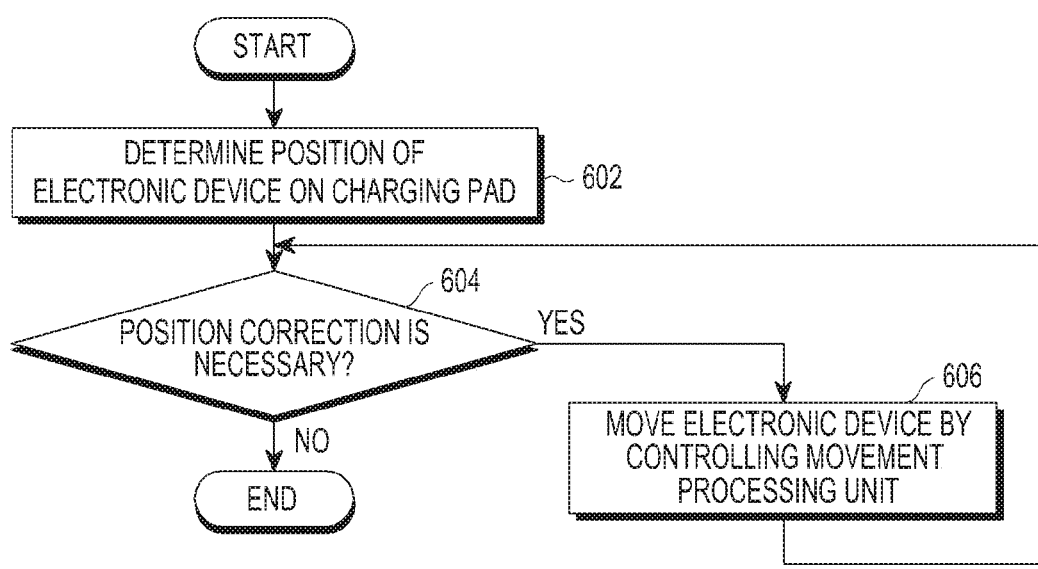
FIG. 6 is a flowchart illustrating an operating procedure in an electronic device according to various embodiments of the present disclosure.

FIG. 6 is a flowchart illustrating an operating procedure in an electronic device according to various embodiments of the present disclosure.

Referring to FIG. 6, in operation 602, the electronic device may determine the position thereof on a charging pad. When it is determined in operation 604 that position correction is necessary, the electronic device may control a movement processing unit (e.g., at least one vibration motor) to move the electronic device in operation 606.

Figure 7:
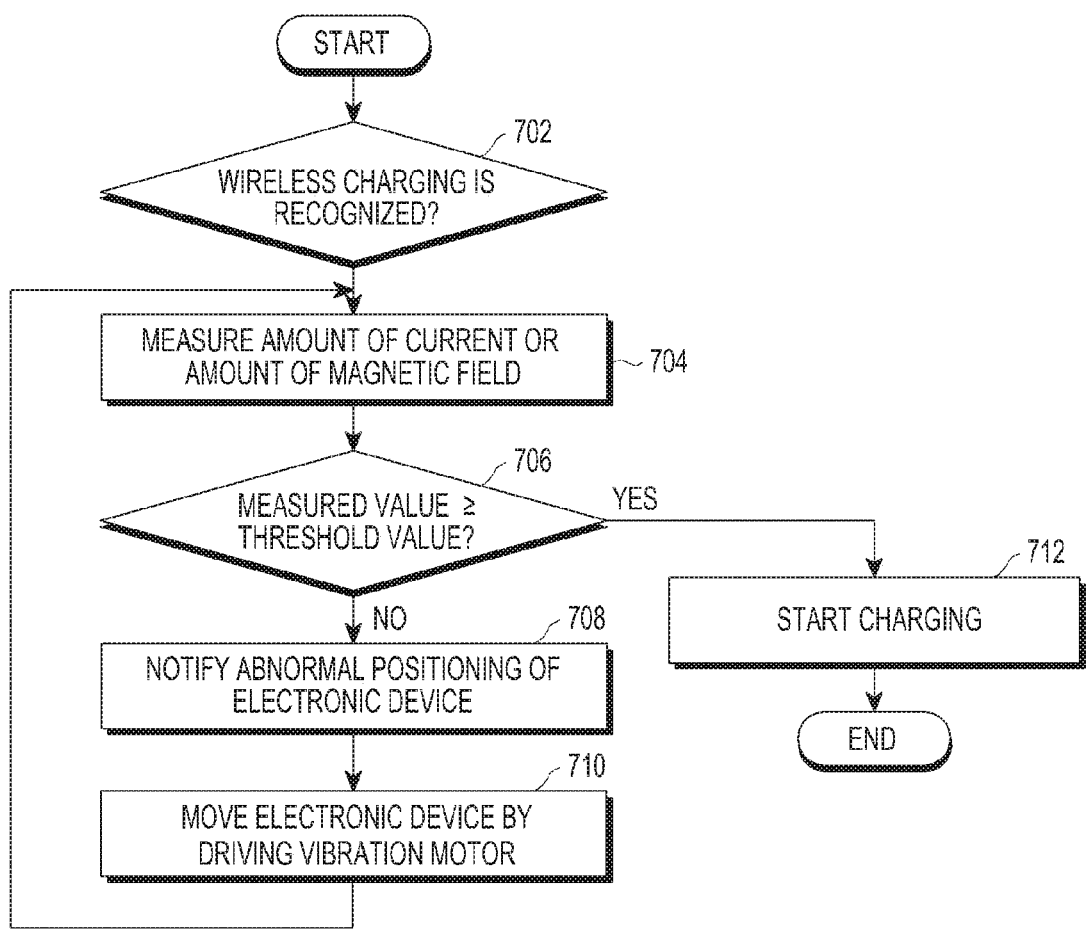
FIG. 7 is a flowchart illustrating a position moving procedure in an electronic device according to various embodiments of the present disclosure.

FIG. 7 is a flowchart illustrating a position moving procedure in an electronic device according to various embodiments of the present disclosure.

Referring to FIG. 7, when the electronic device is placed on a wireless charging pad and is identified to be in a wireless charging state in operation 702, the amount of current or the amount of magnetic field (e.g., magnetic field strength or magnetic flux density) may be measured in operation 704.

When it is determined in operation 706 that the measured value is greater than a threshold value, charging may normally start in operation 712. In contrast, when it is determined in operation 706 that the measured value is less than the threshold value, the electronic device may notify a user that the electronic device is abnormally placed through a speaker or a display screen in operation 708. According to various embodiments of the present disclosure, in operation 710, the electronic device may drive at least one vibration motor to move the electronic device to an optimum position.

At least one of the operations illustrated in FIGS. 6 and 7 may be omitted, or at least one other operation may be added between the operations. In addition, the operations may be sequentially processed as illustrated in FIGS. 6 and 7, or the execution sequence of at least one operation may be switched with that of another operation.

An operating method of an electronic device according to any one of various embodiments of the present disclosure may include: determining whether to correct a position of an electronic device, and generating a control signal for controlling the driving of at least one vibration motor according to the result of the determination.

According to various embodiments of the present disclosure, the control signal may be a signal for controlling a rotation direction of the vibration motor.

According to various embodiments of the present disclosure, the operating method may further include measuring a current value with a current sensor, and determining whether to correct the position of the electronic device based on the current value detected by the current sensor.

According to various embodiments of the present disclosure, the operating method may further include measuring intensity of a magnetic field with a magnetic sensor, and determining whether to correct the position of the electronic device based on the intensity of the magnetic field detected by the magnetic sensor.

According to various embodiments of the present disclosure, the vibration motor may include a first vibration motor disposed on an upper side of the electronic device and a second vibration motor disposed on a lower side of the electronic device, and the operating method may further include controlling driving of the first vibration motor and the second vibration motor according to the result of the determination on the position correction.

According to various embodiments of the present disclosure, the operating method may further include controlling a moving direction of the electronic device by rotating the first vibration motor and the second vibration motor in opposite directions.

According to various embodiments of the present disclosure, the operating method may further include rotating the vibration motor according to the result of the determination on the position correction and then comparing a detected value before the rotation of the vibration motor with a detected value after the rotation of the vibration motor, and making a control to rotate the vibration motor in an opposite direction when the comparison result shows that the detected value after the rotation of the vibration motor is less than that before the rotation of the vibration motor.

According to various embodiments of the present disclosure, the operating method may further include controlling a speaker to output an alert sound when the result of the determination on the position correction shows that the position correction is necessary for the electronic device.

According to various embodiments of the present disclosure, the operating method may further include controlling a display to display an alert message when the result of the determination on the position correction shows that the position correction is necessary for the electronic device.

Figure 8:
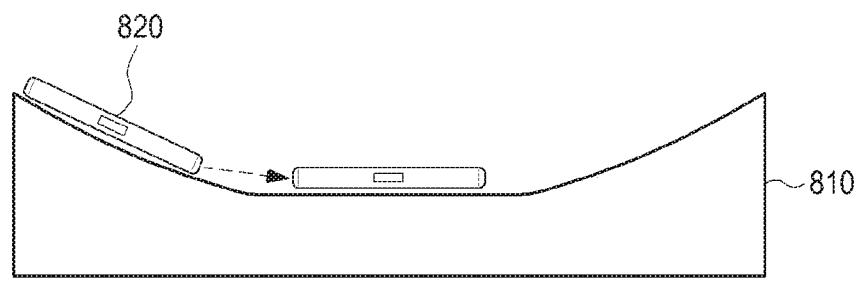
FIG. 8 is a diagram illustrating an operation of moving an electronic device on a curved surface according to various embodiments of the present disclosure.

FIG. 8 is a diagram illustrating an operation of moving an electronic device on a curved surface according to various embodiments of the present disclosure.

Referring to FIG. 8, according to various embodiments of the present disclosure, the electronic device may be moved on a curved surface. When an electronic device 820 (e.g., a smart phone) is located on an inclined portion of a curved pad 810 (e.g., a wireless charging pad), the electronic device 820 may determine that position correction is necessary, using various sensors as described above.

When it is determined that the position correction is necessary, the electronic device 820 may drive at least one vibration motor as described above to move the electronic device 820 to an optimum position (e.g., an optimum charging position).

In cases where the pad on which the electronic device 820 is placed is constituted by a curved surface as illustrated in FIG. 8, the position correction may be made only by simply driving the vibration motor to move the electronic device 820. However, various embodiments of the present disclosure are not limited thereto.

Figure 9:
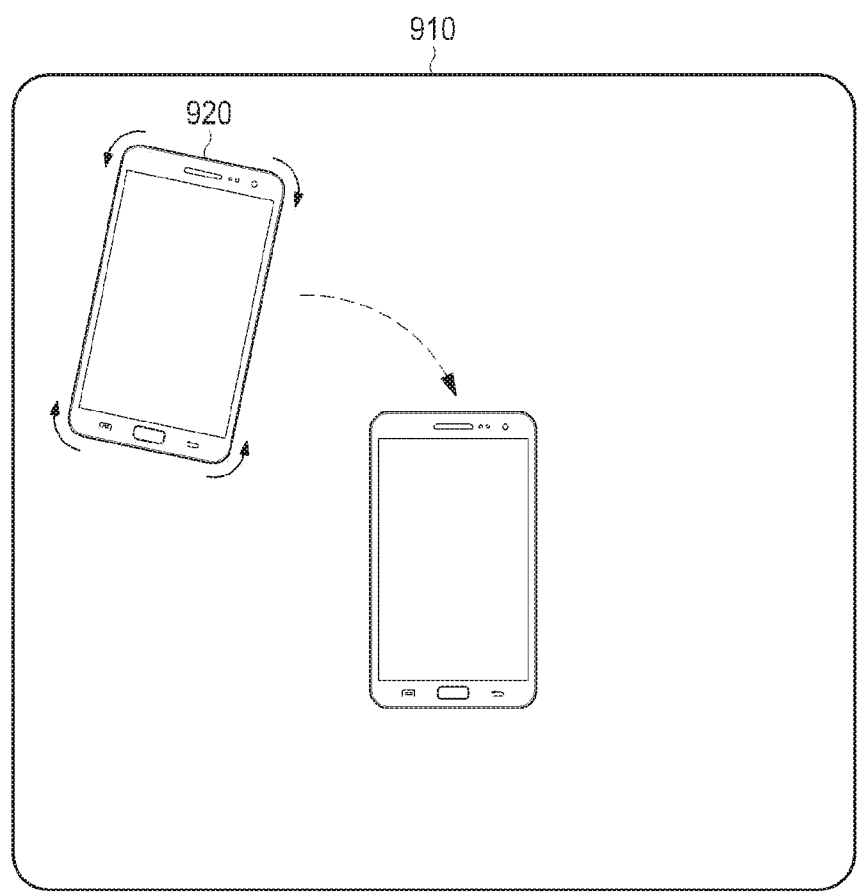
FIG. 9 is a diagram illustrating an operation of moving an electronic device on a flat surface according to various embodiments of the present disclosure.

FIG. 9 is a diagram illustrating an operation of moving an electronic device on a flat surface according to various embodiments of the present disclosure.

Referring to FIG. 9, according to various embodiments of the present disclosure, the electronic device may be moved on a flat surface. When an electronic device 920 (e.g., a smart phone) is located on an edge portion of a flat pad 910 (e.g., a wireless charging pad), the electronic device 920 may determine that position correction is necessary, using various sensors as described above.

When it is determined that the position correction is necessary, the electronic device 920 may drive at least one vibration motor as described above to move the electronic device 920 to an optimum position (e.g., an optimum charging position).

Referring to FIG. 9, in cases where the pad on which the electronic device 920 is placed is constituted by a flat surface, it may be necessary to control the rotation direction of the at least one vibration motor in order to move the electronic device 920 to the optimum position.

Hereinafter, specific embodiments of a method of moving an electronic device on a flat surface by driving at least one vibration motor will be described with reference to FIGS. 10 to 13.

Figure 10:
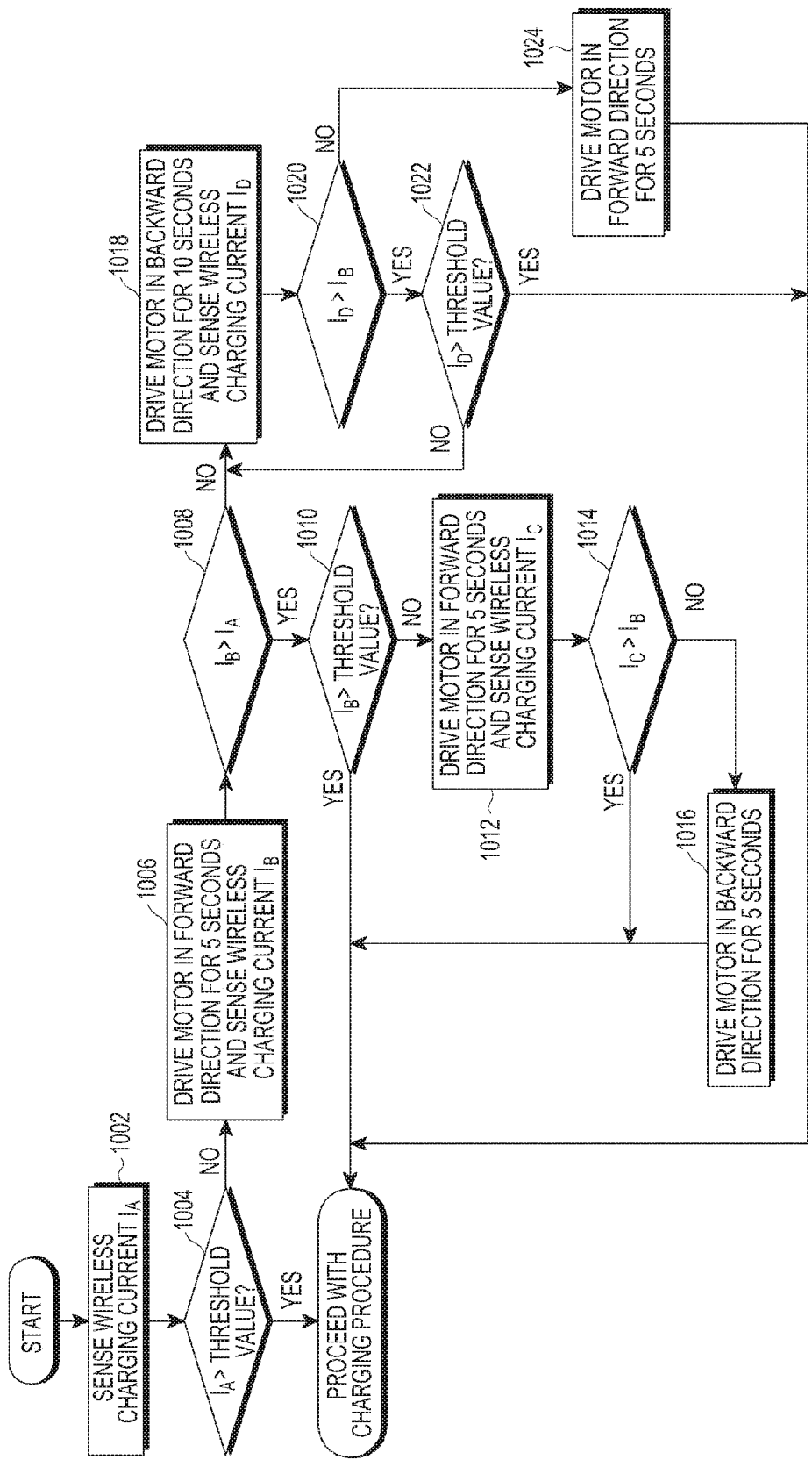
FIG. 10 is a flowchart illustrating a procedure of controlling a position moving operation in an electronic device according to various embodiments of the present disclosure.

FIG. 10 is a flowchart illustrating a procedure of controlling a position moving operation in an electronic device according to various embodiments of the present disclosure.

Referring to FIG. 10, in operation 1002, the electronic device may detect wireless charging current $I_A$. When it is determined in operation 1004 that the detected wireless charging current $I_A$ exceeds a threshold value, the electronic device is determined to be placed at an optimum position, and a normal wireless charging procedure may be performed.

When it is determined in operation 1004 that the detected wireless charging current $I_A$ is less than or equal to the threshold value, the electronic device may drive at least one vibration motor in a forward direction for a preset time (e.g., five seconds) in operation 1006. After the vibration motor is driven, the electronic device may detect wireless charging current $I_B$.

When it is determined in operation 1008 that the detected wireless charging current $I_B$ is greater than the wireless charging current $I_A$ detected before the vibration motor is driven, the electronic device may be determined to have moved to a better position. In operation 1010, the electronic device may determine whether the detected wireless charging current $I_B$ exceeds the threshold value. When it is determined that the detected wireless charging current $I_B$ exceeds the threshold value, the electronic device is determined to be placed at an optimum position, and a normal wireless charging procedure may be performed. When it is determined in operation 1010 that the detected wireless charging current $I_B$ is less than or equal to the threshold value, the electronic device may drive the one or more vibration motors in the forward direction for the preset time (e.g., five seconds) again. After the vibration motor is driven, the electronic device may detect wireless charging current $I_C$.

When it is determined in operation 1014 that the detected wireless charging current $I_C$ is greater than the wireless charging current $I_B$ detected before the vibration motor is additionally driven, the electronic device may be determined to have moved to a better position.

When it is determined in operation 1014 that the detected wireless charging current $I_C$ is less than the wireless charging current $I_B$ detected before the vibration motor is additionally driven, the electronic device may drive the vibration motor in the backward direction for a preset time (e.g., five seconds) in operation 1016.

When it is determined in operation 1008 that the detected wireless charging current $I_B$ is less than the wireless charging current $I_A$ detected before the vibration motor is driven, the electronic device may be determined to have moved to a worse position. Accordingly, the electronic device may make a control to move in an opposite direction to that in which the electronic device has already moved. When it is determined in operation 1008 that the detected wireless charging current $I_B$ is less than the wireless charging current $I_A$ detected before the vibration motor is driven, the electronic device may drive the vibration motor in the backward direction for a preset time (e.g., ten seconds) in operation 1018. After the vibration motor is driven, the electronic device may detect wireless charging current $I_D$.

When it is determined in operation 1020 that the detected wireless charging current $I_D$ is greater than the wireless charging current $I_B$ detected before the vibration motor is driven in the backward direction, the electronic device may be determined to have moved to a better position. In operation 1022, the electronic device may determine whether the detected wireless charging current $I_D$ exceeds the threshold value. When it is determined that the detected wireless charging current $I_D$ exceeds the threshold value, the electronic device is determined to be placed at an optimum position, and a normal wireless charging procedure may be performed.

When it is determined in operation 1022 that the detected wireless charging current $I_D$ is less than or equal to the threshold value, the electronic device may drive the at least one vibration motor in the backward direction for a preset time (e.g., ten seconds) again in operation 1018. After the vibration motor is driven, the electronic device may detect wireless charging current $I_D$.

When it is determined in operation 1020 that the detected wireless charging current $I_D$ is less than the wireless charging current $I_B$ detected before the vibration motor is driven in the backward direction, the electronic device may be determined to have moved to a worse position. Accordingly, the electronic device may make a control to move in an opposite direction to that in which the electronic device has already moved. When it is determined in operation 1020 that the detected wireless charging current $I_D$ is less than the wireless charging current $I_B$ detected before the vibration motor is driven in the backward direction, the electronic device may drive the one or more vibration motors in the forward direction for a preset time (e.g., five seconds) in operation 1024.

At least one of the operations illustrated in FIG. 10 may be omitted, or at least one other operation may be added between the operations. In addition, the operations may be sequentially processed as illustrated in FIG. 10, and the execution sequence of at least one operation may be switched with that of another operation.

Figure 11A:
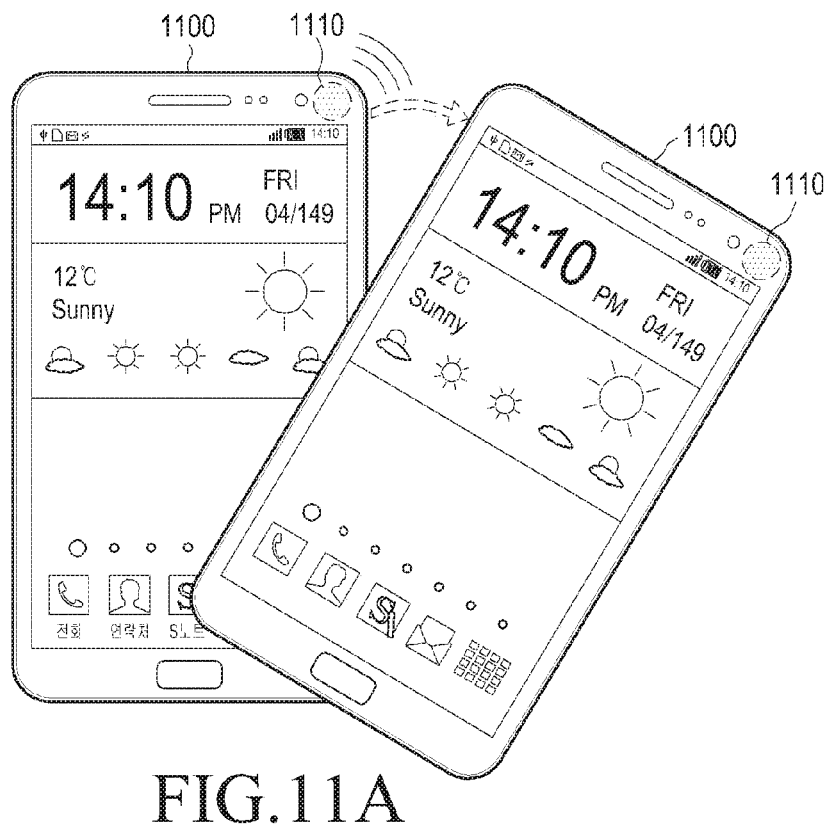
FIGS. 11A and 11B illustrate a method of moving a position using one motor according to various embodiments of the present disclosure.
Figure 11B:
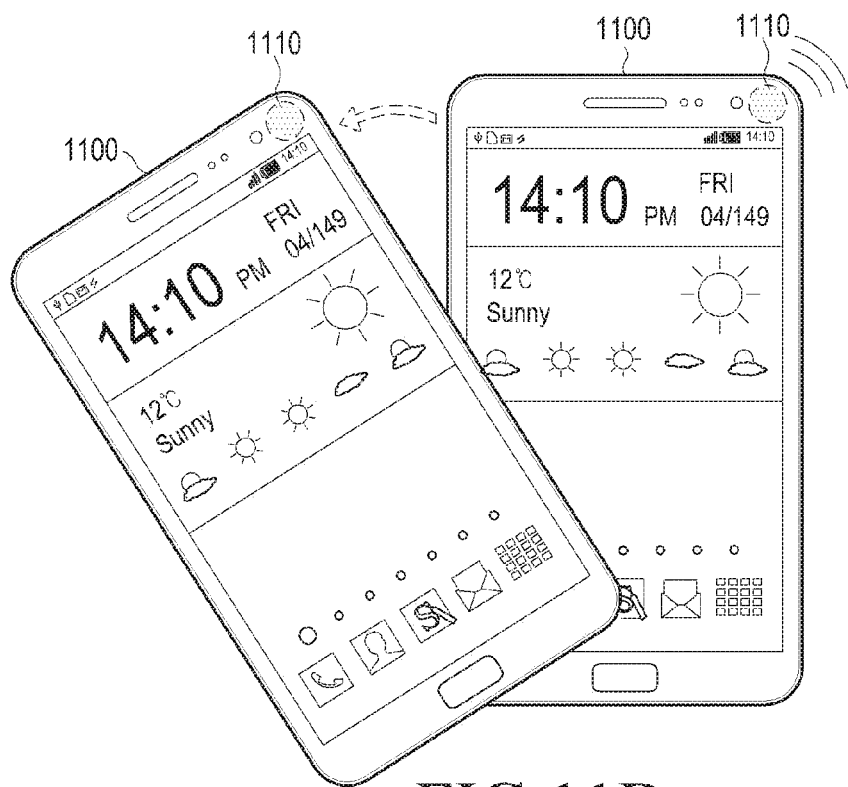

FIGS. 11A and 11B illustrate a method of moving a position using one motor according to various embodiments of the present disclosure.

Referring to FIGS. 11A and 11B, an electronic device 1100 may have one vibration motor 1110 embedded on an upper side thereof. Referring to FIG. 11A, when the vibration motor 1110 may rotate in a forward direction to move the upper end of the electronic device 1100 rightwards. Referring to FIG. 11B, when the vibration motor 1110 may rotate in a backward direction to move the upper end of the electronic device 1100 leftwards.

Figure 12:
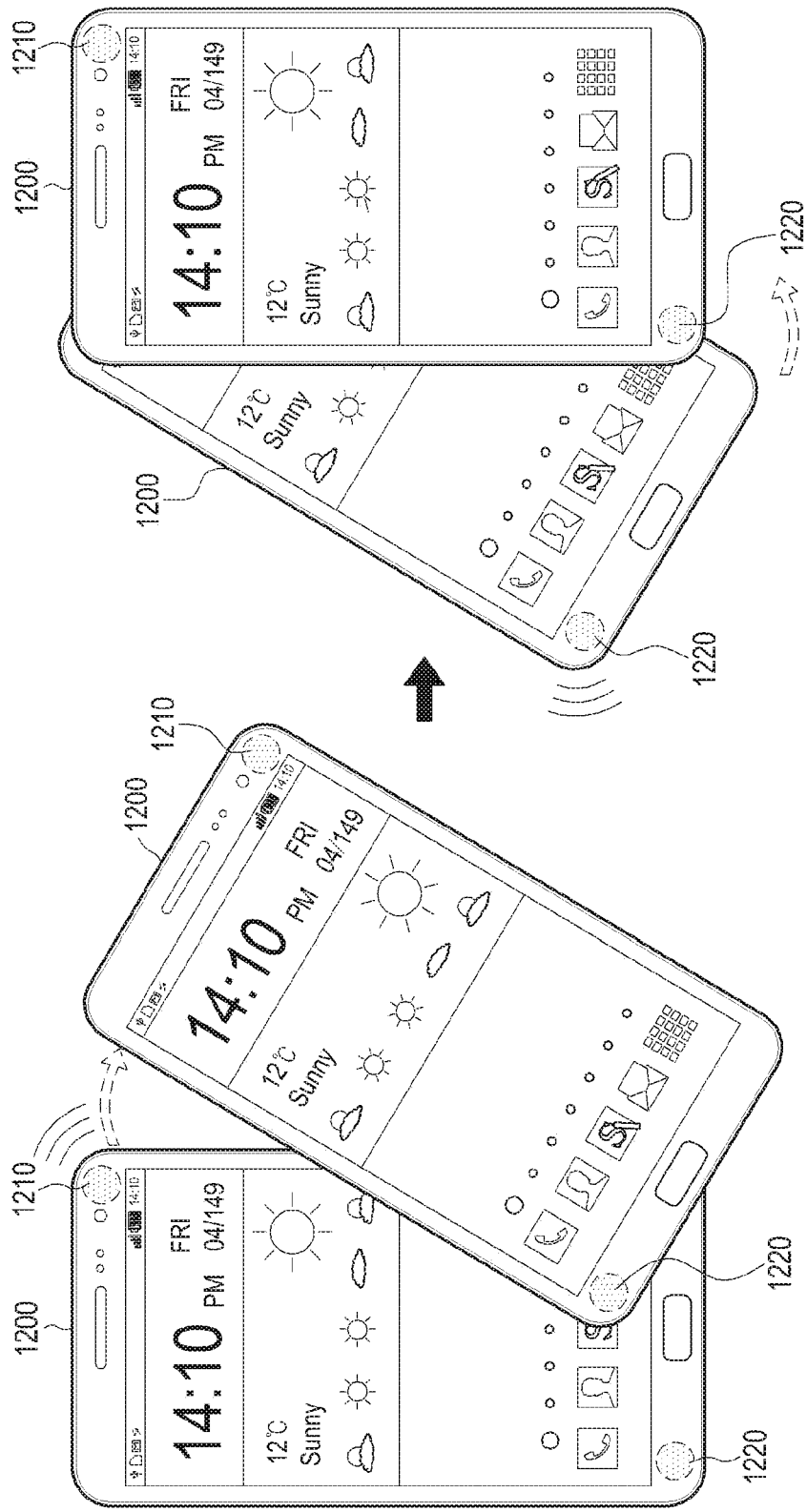
FIG. 12 illustrates a method of moving a position of an electronic device using two motors according to various embodiments of the present disclosure.
Figure 13:
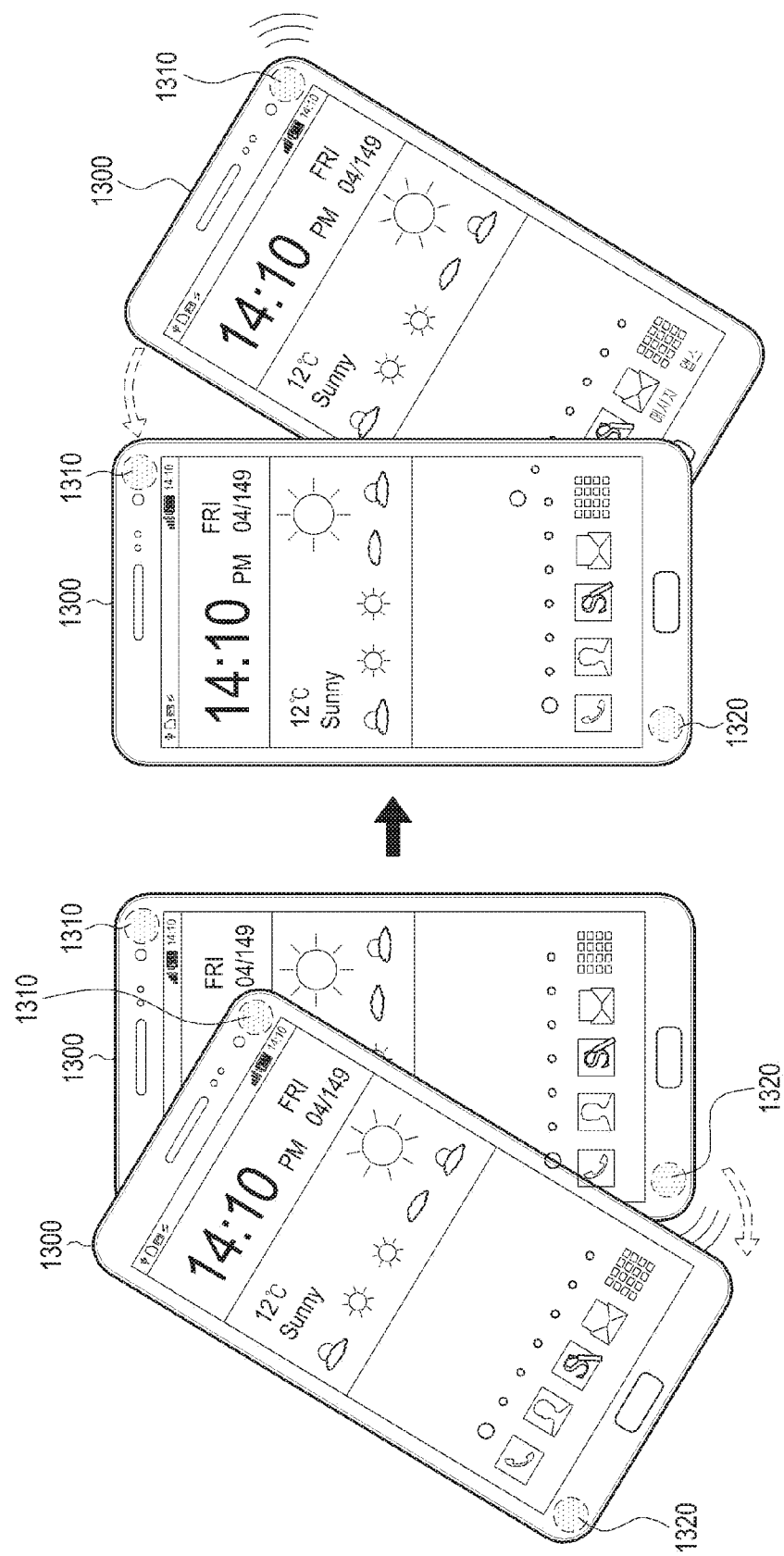
FIG. 13 illustrates a method of moving a position of an electronic device using two motors according to various embodiments of the present disclosure.

FIGS. 12 and 13 illustrate methods of moving a position of an electronic device using two motors according to various embodiments of the present disclosure.

Referring to FIGS. 12 and 13, according to various embodiments of the present disclosure, two vibration motors 1210 and 1220, or 1310 and 1320 may be embedded on upper and lower sides of an electronic device 1200 or 1300 to move the electronic device 1200 or 1300 leftwards or rightwards.

For example, referring to FIG. 12, the electronic device 1200 may include the first vibration motor 1210 on the upper side thereof and the second vibration motor 1220 on the lower side thereof. According to various embodiments of the present disclosure, when the electronic device 1200 wants to move rightwards, the electronic device 1200 may rotate the first vibration motor 1210 in a forward direction to move the upper portion of the electronic device 1200 rightwards and then rotate the second vibration motor 1220 in a backward direction to move the lower portion of the electronic device 1200 rightwards. This operation may result in the electronic device 1200 moving rightwards.

In addition, for example, referring to FIG. 13, the electronic device 1300 may include the first vibration motor 1310 on the upper side thereof and the second vibration motor 1320 on the lower side thereof. According to various embodiments of the present disclosure, when the electronic device 1300 wants to move leftwards, the electronic device 1300 may rotate the second vibration motor 1320 in a forward direction to move the lower portion of the electronic device 1300 leftwards and then rotate the first vibration motor 1310 in a backward direction to move the upper portion of the electronic device 1300 leftwards. This operation may result in the electronic device 1300 moving leftwards.

Figure 14:
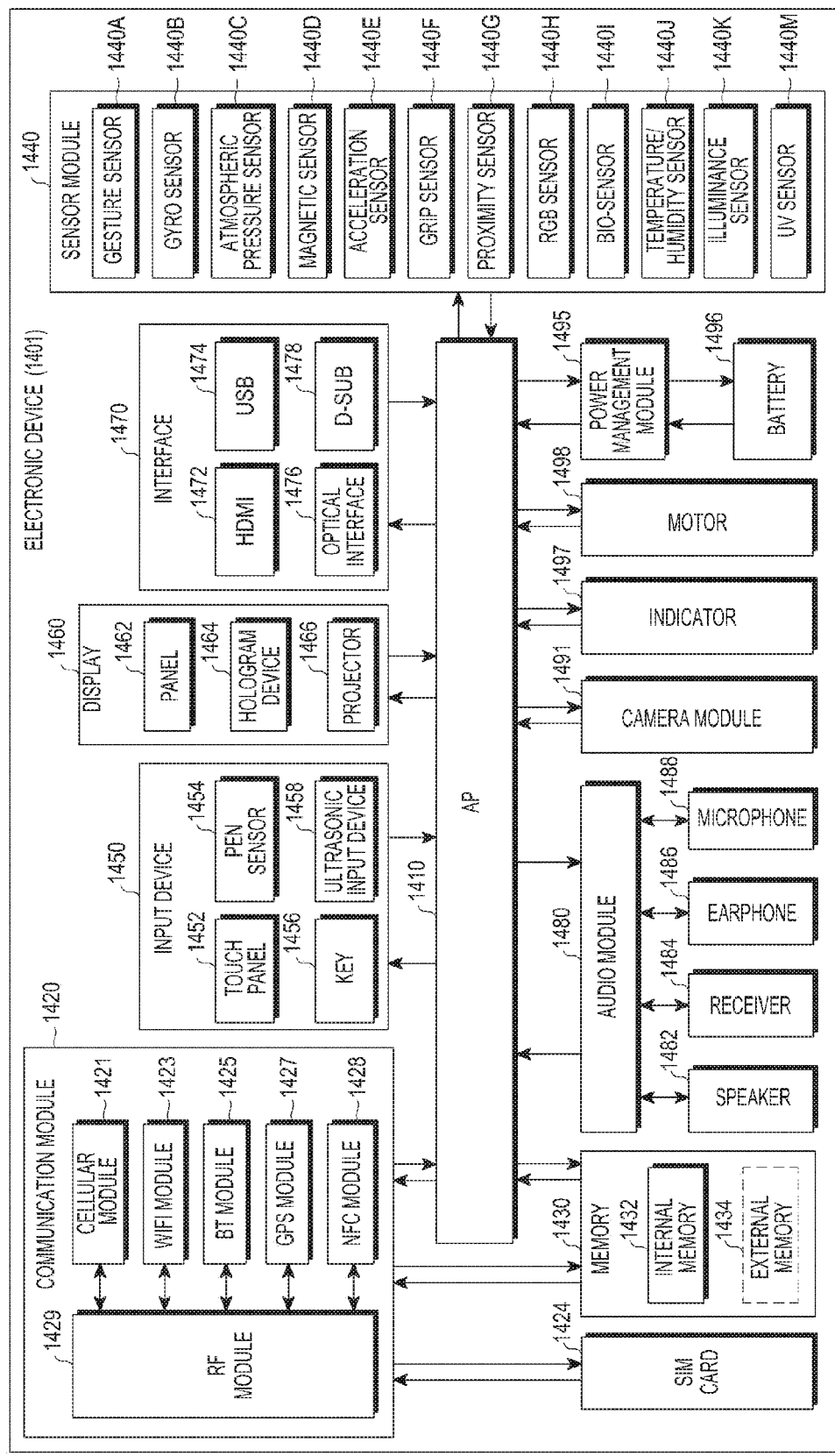
FIG. 14 is a block diagram illustrating a structure of an electronic device according to an embodiment of the present disclosure.

FIG. 14 is a block diagram of an electronic device according to various embodiments of the present disclosure.

Referring to FIG. 14, an electronic device 1401 may include, for example, all or some of the electronic device 101 illustrated in FIG. 1. The electronic device 1401 may include at least one AP 1410, a communication module 1420, a subscriber identification module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may control a plurality of hardware or software elements connected thereto by driving an OS or an application program and perform various types of data processing and calculations. The AP 1410 may be embodied as, for example, a system on chip (SoC). According to an embodiment of the present disclosure, the AP 1410 may further include a Graphic Processing Unit (GPU) and/or an image signal processor. The AP 1410 may also include at least some (e.g., a cellular module 1421) of the elements illustrated in FIG. 14. The AP 1410 may load instructions or data, received from at least one other element (e.g., a non-volatile memory), in a volatile memory to process the loaded instructions or data and may store various types of data in a non-volatile memory.

The communication module 1420 may have a configuration the same as or similar to the communication interface 170 of FIG. 1. The communication module 1420 may include, for example, a cellular module 1421, a Wi-Fi module 1423, a BT module 1425, a GPS module 1427, a Near Field Communication (NFC) module 1428, and a Radio Frequency (RF) module 1429.

The cellular module 1421 may provide, for example, a voice call, a video call, a text message service, or an Internet service through a communication network. According to an embodiment of the present disclosure, the cellular module 1421 may distinguish and authenticate the electronic devices 1401 within a communication network using a SIM (e.g., the SIM card 1424). According to an embodiment of the present disclosure, the cellular module 1421 may perform at least some functions that the AP 1410 may provide. According to an embodiment of the present disclosure, the cellular module 1421 may include a CP.

The Wi-Fi module 1423, the BT module 1425, the GPS module 1427, and the NFC module 1428 may include, for example, a processor for processing data transmitted/received through the corresponding module. According to an embodiment of the present disclosure, at least some (e.g., two or more) of the cellular module 1421, the Wi-Fi module 1423, the BT module 1425, the GPS module 1427, and the NFC module 1428 may be included in one integrated chip (IC) or IC package.

The RF module 1429 may transmit/receive, for example, a communication signal (e.g., an RF signal). The RF module 1429 may include, for example, a transceiver, a power amp module (PAM), a frequency filter, a low noise amplifier (LNA), an antenna, and the like. According to another embodiment of the present disclosure, at least one of the cellular module 1421, the Wi-Fi module 1423, the BT module 1425, the GPS module 1427, and the NFC module 1428 may transmit/receive an RF signal through a separate RF module.

The SIM card 1424 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 1430 may include, for example, an internal memory 1432 or an external memory 1434. The internal memory 1432 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a Not AND (NAND) flash memory or a Not OR (NOR) flash memory), a hard disc drive, a solid state drive (SSD), and the like).

The external memory 1434 may further include a flash drive, for example, a compact flash (CF), a secure digital (SD), a Micro-SD, a Mini-SD, an eXtreme Digital (xD), a memory stick, and the like. The external memory 1434 may be functionally and/or physically connected to the electronic device 1401 through various interfaces.

The sensor module 1440 may measure a physical quantity or detect an operating state of the electronic device 1401 and convert the measured or detected information to an electric signal. The sensor module 1440 may include, for example, at least one of a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., a Red, Green, Blue (RGB) sensor), a biometric sensor 1440I, a temperature/humidity sensor 1440J, an illumination sensor 1440K, and a ultraviolet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 1440 may further include a control circuit for controlling at least one sensor included therein. In an embodiment of the present disclosure, the electronic device 1401 may further include a processor that is configured as a part of the AP 1410 or a separate element from the AP 1410 to control the sensor module 1440, and may control the sensor module 1440 while the AP 1410 is in a sleep state.

The input device 1450 may include, for example, a touch panel 1452, a (digital) pen sensor 1454, a key 1456, or an ultrasonic input device 1458. The touch panel 1452 may use at least one of, for example, a capacitive type, a resistive type, an infrared type, and an ultrasonic type. The touch panel 1452 may further include a control circuit. The touch panel 1452 may further include a tactile layer and provide a tactile reaction to the user.

The (digital) pen sensor 1454 may be a part of the touch panel or may include a separate recognition sheet. The key 1456 may include, for example, a physical button, an optical key or a keypad. The ultrasonic input unit 1458 may identify data by detecting an acoustic wave with a microphone (e.g., a microphone 1488) of the electronic device 1401 through an input unit for generating an ultrasonic signal.

The display 1460 (e.g., the display 160) may include a panel 1462, a hologram device 1464, or a projector 1466. The panel 1462 may include a configuration the same as or similar to the display 160 of FIG. 1. The panel 1462 may be implemented to be, for example, flexible, transparent, wearable, and the like. The panel 1462 may also be configured as one module together with the touch panel 1452. The hologram device 1464 may show a stereoscopic image in the air using interference of light. The projector 1466 may project light onto a screen to display an image. The screen may be located, for example, in the interior or on the exterior of the electronic device 1401. According to an embodiment of the present disclosure, the display 1460 may further include a control circuit for controlling the panel 1462, the hologram device 1464, or the projector 1466.

The interface 1470 may include, for example, a HDMI 1472, a USB 1474, an optical interface 1476, or a D-sub-miniature (D-sub) 1478. The interface 1470 may be included in, for example, the communication interface 170 illustrated in FIG. 1. Additionally or alternatively, the interface 1470 may include, for example, a mobile high-definition link (MI-IL) interface, an SD card/multi-media card (MMC) interface, an infrared data association (IrDA) standard interface, and the like.

The audio module 1480 may bilaterally convert, for example, a sound and an electrical signal. At least some elements of the audio module 1480 may be included in, for example, the input/output interface 150 illustrated in FIG. 1. The audio module 1480 may process voice information input or output through, for example, a speaker 1482, a receiver 1484, earphones 1486, or the microphone 1488.

The camera module 1491 may capture, for example, a still image or a moving image and, according to an embodiment of the present disclosure, may include one or more image sensors (e.g., a front sensor or a rear sensor), a lens, an image signal processor (ISP), a flash (e.g., an LED or a xenon lamp), and the like.

The power management module 1495 may manage, for example, power of the electronic device 1401. According to an embodiment of the present disclosure, the power management module 1495 may include a Power Management Integrated Circuit (PMIC), a charger IC, or a battery or fuel gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, the residual quantity of the battery 1496, a charging voltage and current, or temperature. The battery 1496 may include, for example, a rechargeable battery or a solar battery.

The indicator 1497 may indicate a particular status of the electronic device 1401 or a part thereof (e.g., the AP 1410), for example, a booting status, a message status, a charging status, and the like. The motor 1498 may convert an electric signal into a mechanical vibration and generate a vibration or a haptic effect. Although not illustrated, the electronic device 1401 may include a processing unit (e.g., a GPU) for supporting mobile TV. The processing unit for supporting mobile TV may process media data according to a standard of Digital Multimedia Broadcasting (DMB), Digital Video Broadcasting (DVB), media flow, and the like.

Each of the components of the electronic device according to the present disclosure may be implemented by one or more components and the name of the corresponding component may vary depending on the type of the electronic device. The electronic device according to the present disclosure may include one or more of the aforementioned components or may further include other additional components, or some of the aforementioned components may be omitted. Further, some of the elements of the electronic device according to various embodiments of the present disclosure may be coupled to form a single entity while performing the same functions as those of the corresponding elements before the coupling.

Figure 15:
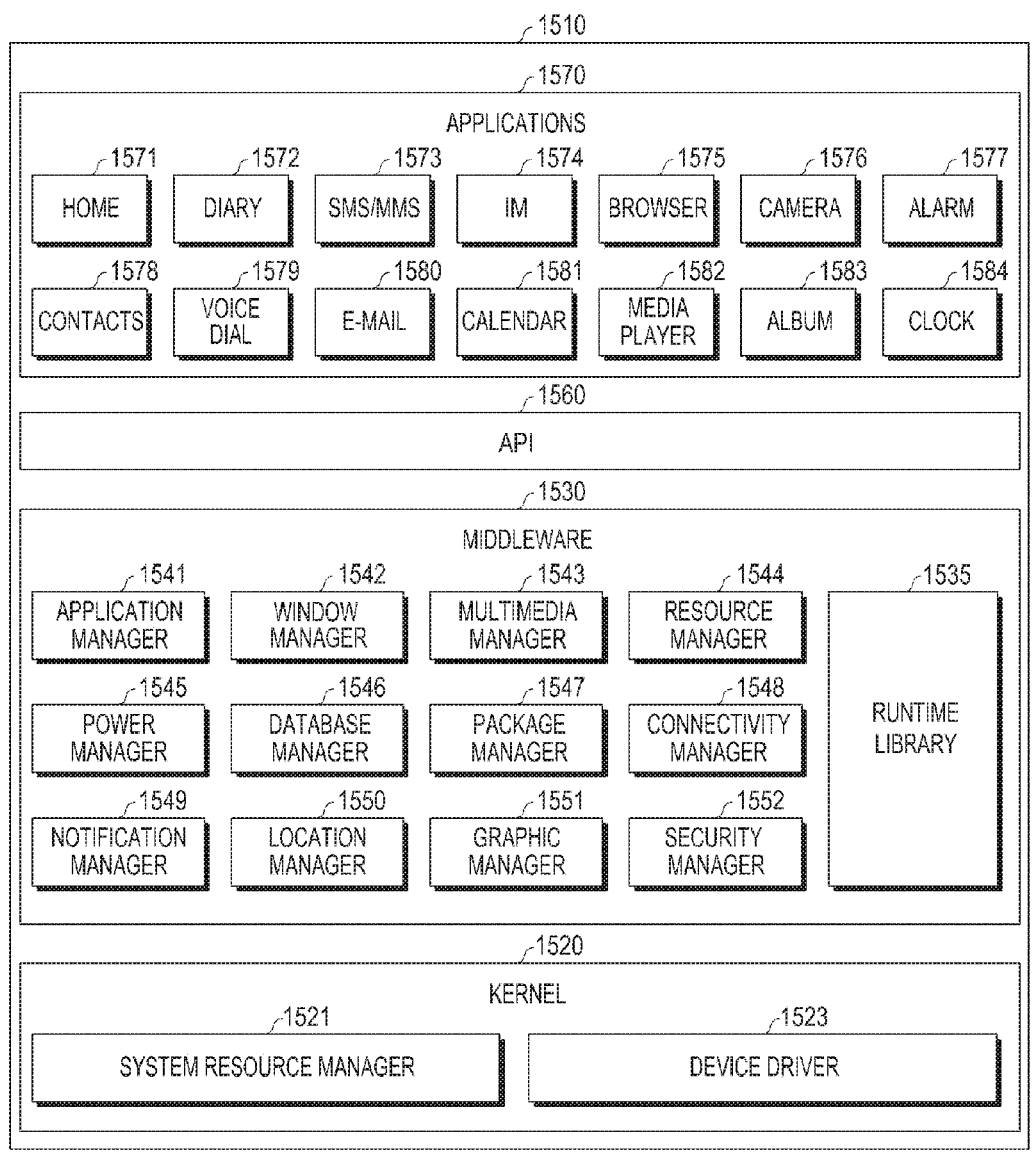
FIG. 15 is a block diagram of a program module according to various embodiments of the present disclosure.

FIG. 15 is a block diagram of a program module according to various embodiments of the present disclosure.

Referring to FIG. 15, a program module 1510 (e.g., the program 140) may include an OS for controlling resources related to the electronic device (e.g., the electronic device 101) and/or various applications (e.g., the application program 147) executed in the OS. The OS may be, for example, Android, iOS, Windows, Symbian, Tizen, Bada, and the like.

The program module 1510 may include a kernel 1520, middleware 1530, an API 1560, and/or applications 1570. At least some of the program module 1510 may be preloaded in the electronic device or downloaded from the server (e.g., the server 106).

The kernel 1520 (e.g., the kernel 141 of FIG. 1) may include, for example, a system resource manager 1521 or a device driver 1523. The system resource manager 1521 may control, assign, or recover the system resources. According to an embodiment of the present disclosure, the system resource manager 1521 may include a process management unit, a memory management unit, a file system management unit, and the like. The device driver 1523 may include, for example, a display driver, a camera driver, a Bluetooth driver, a shared-memory driver, a USB driver, a keypad driver, a Wi-Fi driver, an audio driver, an inter-process communication (IPC) driver, and the like.

The middleware 1530 may provide a function commonly required by the applications 1570 or provide various functions to the applications 1570 through the API 1560 so that the applications 1570 can efficiently use limited system resources of the electronic device. According to an embodiment of the present disclosure, the middleware 1530 (e.g., the middleware 143) may include, for example, at least one of a run time library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The run time library 1535 may include, for example, a library module that a compiler uses in order to add new functions through a programming language while the applications 1570 are executed. The run time library 1535 may perform input/output management, memory management, or a function for an arithmetic function.

The application manager 1541 may, for example, manage a life cycle of at least one of the applications 1570. The window manager 1542 may manage Graphical User Interface (GUI) resources used on the screen. The multimedia manager 1543 may identify a format required for reproducing various media files and encode or decode the media file using a codec appropriate for the corresponding format. The resource manager 1544 may manage resources, such as a source code, a memory, a storage space, and the like, of at least one of the applications 1570.

The power manager 1545 may operate together with a Basic Input/Output System (BIOS) to manage a battery or power, and may provide power information required for the operation of the electronic device. The database manager 1546 may generate, search for, or change a database to be used by at least one of the applications 1570. The package manager 1547 may manage the installation or the updating of applications distributed in a package file form.

The connectivity manager 1548 may manage, for example, wireless connections, such as Wi-Fi or BT. The notification manager 1549 may display or notify an event, such as a received message, an appointment, and a proximity notification, to a user without disturbance. The location manager 1550 may manage location information of the electronic device. The graphic manager 1551 may manage graphic effects to be provided to a user and user interfaces related to the graphic effects. The security manager 1552 may provide various security functions required for system security or user authentication. According to an embodiment of the present disclosure, in cases where the electronic device (e.g., the electronic device 101) has a telephone call function, the middleware 1530 may further include a telephony manager for managing a voice or video call function of the electronic device.

The middleware 1530 may include a middleware module for forming a combination of various functions of the aforementioned elements. The middleware 1530 may provide modules specialized according to types of OSs in order to provide differentiated functions. In addition, the middleware 1530 may dynamically remove some of the existing elements or add new elements.

The API 1560 (e.g., the API 145), which is a set of API programming functions, may include different configurations according to OSs. For example, for Android or iOS, one API set may be provided to each platform, and for Tizen, two or more API sets may be provided to each platform.

The applications 1570 (e.g., the application program 147) may include one or more of a home application 1571, a diary application 1572, a Short Message Service (SMS)/Multimedia Messaging Service (MMS) application 1573, an instant message (IM) application 1574, a browser application 1575, a camera application 1576, an alarm application 1577, a contact application 1578, a voice dial application 1579, an e-mail application 1580, a calendar application 1581, a media player application 1582, an album application 1583, a clock application 1584, a health care application (e.g., an application for measuring a work rate or blood sugar), and an environmental information application (e.g., an application for providing atmospheric pressure, humidity, or temperature information).

According to an embodiment of the present disclosure, the applications 1570 may include an application (hereinafter, referred to as an "information exchange application" for convenience of the description) for supporting information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to the external electronic device (e.g., the electronic device 102 or 104), notification information generated from the other applications of the electronic device (e.g., the SMS/MMS application, the e-mail application, the health management application, and the environmental information application). In addition, the notification relay application may, for example, receive notification information from the external electronic device and provide the received notification information to the user. The device management application may, for example, manage (e.g., install, delete, update, and the like) at least one function of the external electronic device (e.g., the electronic device 104) communicating with the electronic device (e.g., a function of turning on/off the external electronic device itself (or some components) or a function of adjusting luminance (or a resolution) of the display), applications operating in the external electronic device, or services provided by the external electronic device (e.g., a call service and a message service).

According to an embodiment of the present disclosure, the applications 1570 may include an application (e.g., health management application) designated according to attributes (e.g., attributes of the electronic device, such as the type of electronic device which corresponds to a mobile medical device) of the external electronic device (e.g., the electronic device 102 or 104). According to an embodiment of the present disclosure, the applications 1570 may include an application received from the external electronic device (e.g., the server 106, or the electronic device 102 or 104). According to an embodiment of the present disclosure, the applications 1570 may include a preloaded application or a third party application that can be downloaded from a server. The names of the elements of the program module 1510 according to the embodiment illustrated in FIG. 15 may vary according to the type of OS.

According to various embodiments of the present disclosure, at least a part of the programming module 1510 may be implemented in software, firmware, hardware, or a combination of two or more thereof. At least some of the programming module 1610 may be implemented (for example, executed) by, for example, the processor (for example, the AP 1510). At least some of the programming module 1510 may include, for example, a module, a program, a routine, sets of instructions, or a process for performing one or more functions.

The term "module" or "functional unit" used herein may, for example, mean a unit including one of hardware, software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" or "function unit" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When he command is executed by one or more processors (for example, the processor 120), the one or more processors may execute a function corresponding to the command. The computer-readable storage medium may be, for example, the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed in a different order, some of the operations may be omitted, or other operations may be added.

According to various embodiments of the present disclosure, in a storage medium having instructions stored therein, the instructions are set to allow at least one processor to perform at least one operation when executed by the at least one processor, and the at least one operation may include: determining whether to correct a position of an electronic device, and generating a control signal for controlling driving of at least one vibration motor according to the result of the determination.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one sensor;
   at least one vibration motor; and
   a processor configured to:
      determine whether the electronic device is located on an inclined portion of a charging pad of a wireless power transmitter through the at least one sensor,
      determine whether to correct a position of the electronic device based on whether the electronic device is located on the inclined portion of the charging pad, and
      control driving of the at least one vibration motor according to a result of the determination on the position correction.

2. The electronic device of claim 1, wherein the processor is further configured to control a moving direction of the electronic device by controlling a rotation direction of the at least one vibration motor.

3. The electronic device of claim 1, further comprising:
   a current sensor configured to measure current,
   wherein the processor is further configured to determine whether to correct the position of the electronic device based on the current value detected by the current sensor.

4. The electronic device of claim 1, further comprising:
   a magnetic sensor configured to measure intensity of a magnetic field,
   wherein the processor is further configured to determine whether to correct the position of the electronic device based on the intensity of the magnetic field detected by the magnetic sensor.

5. The electronic device of claim 1, further comprising:
   a first vibration motor disposed on an upper side of the electronic device; and
   a second vibration motor disposed on a lower side of the electronic device,
   wherein the processor is further configured to control the driving of the first vibration motor and the second vibration motor according to the result of the determination on the position correction.

6. The electronic device of claim 5, wherein the processor is further configured to control a moving direction of the electronic device by rotating the first vibration motor and the second vibration motor in opposite directions.

7. The electronic device of claim 1, wherein the processor, after rotating the at least one vibration motor according to the result of the determination on the position correction, is further configured to control the at least one vibration motor to rotate in an opposite direction when a detected value is less than that detected before the at least one vibration motor rotates.

8. The electronic device of claim 1, further comprising:
   a speaker,
   wherein the processor is further configured to control the speaker to output an alert sound when the result of the determination on the position correction shows that the position correction is necessary for the electronic device.

9. The electronic device of claim 1, further comprising:
a display,
wherein the processor is further configured to control the display to display an alert message when the result of the determination on the position correction shows that the position correction is necessary for the electronic device.

10. The electronic device of claim 1, wherein the processor is further configured to make a control to start wireless charging when the result of the determination on the position correction shows that the electronic device is placed at a normal position.

11. A method comprising:
determining whether an electronic device is located on an inclined portion of a charging pad of a wireless power transmitter through at least one sensor of the electronic device;
determining whether to correct a position of the electronic device based on whether the electronic device is located on the inclined portion of the charging pad; and
generating a control signal for controlling driving of at least one vibration motor according to a result of the determination.

12. The method of claim 11, wherein the control signal comprises a signal for controlling a rotation direction of the at least one vibration motor.

13. The method of claim 11, further comprising:
measuring a current value with a current sensor; and
determining whether to correct the position of the electronic device based on the current value detected by the current sensor.

14. The method of claim 11, further comprising:
measuring intensity of a magnetic field with a magnetic sensor; and
determining whether to correct the position of the electronic device based on the intensity of the magnetic field detected by the magnetic sensor.

15. The method of claim 11,
wherein the at least one vibration motor comprises a first vibration motor disposed on an upper side of the electronic device and a second vibration motor disposed on a lower side of the electronic device, and
wherein the method further comprises controlling the driving of the first vibration motor and the second vibration motor according to the result of the determination on the position correction.

16. The method of claim 15, further comprising:
controlling a moving direction of the electronic device by rotating the first vibration motor and the second vibration motor in opposite directions.

17. The method of claim 11, further comprising:
rotating the at least one vibration motor according to the result of the determination on the position correction and then comparing a detected value before the rotation of the at least one vibration motor with a detected value after the rotation of the at least one vibration motor; and
making a control to rotate the at least one vibration motor in an opposite direction when the comparison result shows that the detected value after the rotation of the at least one vibration motor is less than that before the rotation of the at least one vibration motor.

18. The method of claim 11, further comprising:
controlling a speaker to output an alert sound when the result of the determination on the position correction shows that the position correction is necessary for the electronic device.

19. The method of claim 11, further comprising:
controlling a display to display an alert message when the result of the determination on the position correction shows that the position correction is necessary for the electronic device.

20. The method of claim 11, further comprising:
starting wireless charging when the result of the determination on the position correction shows that the electronic device is placed at a normal position.

21. At least one non-transitory computer readable storage medium for storing a computer program recorded therein which is executed on a computer, wherein the computer program comprises an executable instruction for allowing a processor to:
determine whether an electronic device is located on an inclined portion of a charging pad of a wireless power transmitter through at least one sensor of the electronic device,
determine whether to correct a position of the electronic device based on whether the electronic device is located on the inclined portion of the charging pad, and
generate a control signal for controlling driving of at least one vibration motor according to a result of the determination when the program is executed by the processor.

* * * * *